3,232,520
PRESSURE EXCHANGERS
Dudley Brian Spalding, Wimbledon, London, England, assignor to Power Jets (Research & Development) Limited, London, England, a British company
Filed May 7, 1963, Ser. No. 278,715
Claims priority, application Great Britain, May 17, 1962, 19,144/62
6 Claims. (Cl. 230—69)

The invention relates to pressure exchangers.

The term "pressure exchanger" is used herein to mean apparatus comprising cells in which one elastic fluid quantity expands, so compressing another elastic fluid quantity with which it is in direct contact, ducting to lead elastic fluid at different pressures steadily to and from the cells and means to effect relative motion between the cells and the ducting. The cells are usually arranged around a rotor in the form of a ring.

In previously published proposals for the construction of pressure exchangers, the cells have been of constant volume. Owing mainly to the constant volume of the cells, cycle pressure ratios have been limited except for proposals involving complicated cycles or compounded machines.

According to the present invention, a pressure exchanger includes a cell rotor, structure circumferentially surrounding the cell rotor, a plurality of walls arranged around the rotor and defining a plurality of open-ended cells, end-plate structure effective to close the ends of the cells but having ports including a port to lead high-pressure elastic fluid to the cells, ports to lead low-pressure elastic fluid to and from the cells and ports to lead elastic fluid at pressures intermediate the aforementioned high and low pressures to and from the cells, ducting to connect the ports to lead intermediate pressure elastic fluid to and from the cells, and means for varying the volume of the cells on relative motion between the cells and the end-plate structure. Preferably the cells walls are movable relative to the rotor, and the volume of the cells is varied by effecting such a movement.

Figures 1, 2:
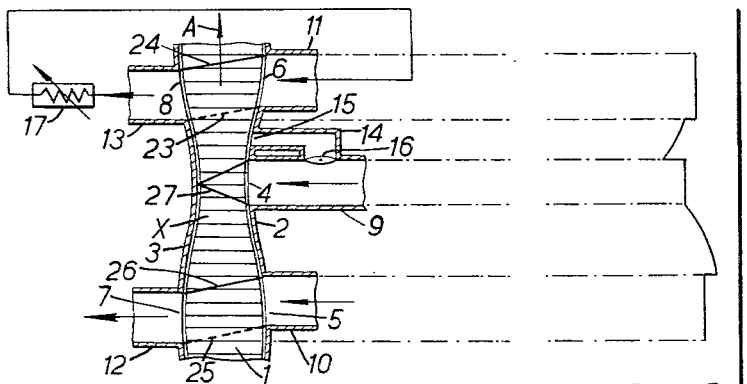
Figure 3:
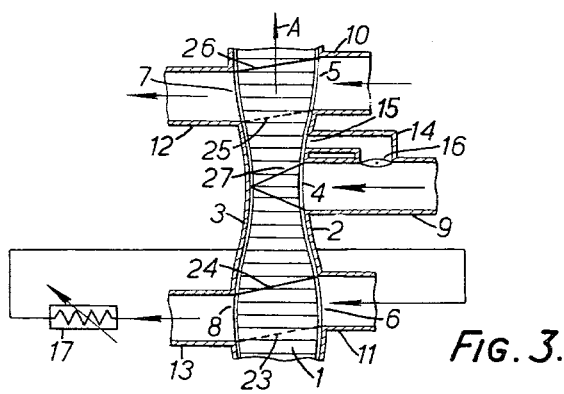
Figure 4:
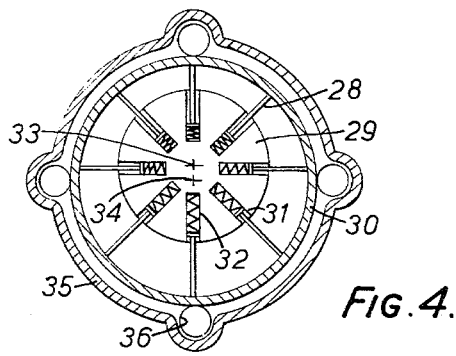

An embodiment of the invention will now be described by way of example, with reference to the accompanying diagrammatic drawing in which:

FIGURE 1 is a developed view of a pressure exchanger in accordance with the invention, in which radial variation of the volume of the cells of the pressure exchanger has been indicated for clarity of explanation by axial variation in the length of the cell walls;

FIGURE 2 graphically illustrates the relative pressures of fluid at various stages in the pressure exchanger cycle;

FIGURE 3 shows a developed view of a further embodiment of a pressure exchanger in accordance with the present invention; and FIGURE 4 shows an end-view of a pressure exchanger cell ring having radially outwardly slidable cell walls.

Referring to FIGURE 1, the pressure exchanger has cells 1 of variable volume and end-plates 2, 3 one at each end of the cells. The end-plate 2 has ports 4, 5 and 6 for the admission of fluid to the cells and the end-plate 3 has ports 7 and 8 for the extraction of fluid from the cells. High-pressure fluid is led to the cells through the high-pressure inlet port 4, low-pressure fluid is led to the cells through the low-pressure inlet port 5, fluid at a pressure intermediate the aforementioned high and low-pressures is led to the cells through the intermediate pressure inlet port 6, low-pressure fluid is led from the cells through the low-pressure outlet port 7 and fluid at a pressure intermediate the aforementioned high and low-pressures is led from the cells through the intermediate pressure outlet port 8. Ducts corresponding to these ports are referenced 9, 10, 11, 12 and 13 respectively. The low-pressure inlet port 5, the low-pressure outlet port 7 and cells at any one time in communication with these ports constitute a low-pressure scavenging stage of the pressure exchanger, and the intermediate pressure inlet port 6, the intermediate pressure outlet port 8 and cells at any one time in communication with these ports constitute an intermediate pressure scavenging stage of the pressure exchanger. A bleed duct 14 communicates at one end with the duct 9 and at its other end with the cells of the pressure exchanger through a port 15 positioned sequential to the high-pressure inlet port 4. A spring loaded non-return valve 16 is positioned in the duct 14.

The intermediate pressure outlet duct 13 communicates with the inlet side of a cooler 17, the outlet side of which communicates with the duct 11 to lead fluid to the cells of the pressure exchanger through the intermediate pressure inlet port 6.

FIGURE 2 illustrates the relative pressures of the fluid in the cells of the pressure exchanger, illustrated in FIGURE 1, at various positions during the pressure exchanger cycle.

In operation, the cells 1 of the cell ring are continuously moving past the ports and the lands between the ports in the direction of arrow A. Thus, the cycle for the purpose of description may be considered to start at any position.

Assuming that the cycle starts at a position X, fluid trapped in the cell passing the position X will be stationary relative to the cell structure and both ends of that cell will be closed by the end-plates 2 and 3. The fluid is introduced to the cell in a manner to be described hereinafter. As this cell continues to rotate, its right-hand end (as shown in FIGURE 1) is opened to the high-pressure inlet port 4 which forms a termination of the duct 9. The fluid in the duct 9, which may be pressurized fluid at atmospheric temperature, is at a higher pressure than the fluid in the cells, consequently compression waves, diagrammatically shown at 27, will pass through the cell thus compressing the contents of the cell. As the cell ring continues to rotate, the cell becomes closed at both ends by the end-plates 2, 3 and the contents of the cell are progressively expanded and lowered in temperature by the increasing volume of the cell. The left-hand end of the cell is then opened to the intermediate pressure scavenging stage outlet port 8, which communicates with the outlet duct 13 to lead fluid at an intermediate pressure and an intermediate temperature from the cells. The stagnation pressure of the fluid in the duct 13 is lower than the initial stagnation pressure within the cell. Consequently, expansion waves of small amplitude, shown diagrammatically at 23, pass through the cell as the fluid in the cell leaves through the port 8, and will create a low-pressure region at the right-hand end of the cell. Fluid passing through the duct 13 is admitted to the cooler 17 in which heat is extracted from the fluid and the fluid is thereby further cooled. Fluid passing from the cooler 17 is led via the duct 11 and intermediate pressure inlet port 6 to the cells of the pressure exchanger. Since the pressure in the cell is lower than total pressure in the inlet duct 11, lower temperature fluid at an intermediate pressure will flow through the port 6 into the cell as the fluid in the cell is expelled through the port 8. As soon as the left-hand end of the cell is closed by the end-plate 3, compression waves, diagrammatically indicated at 24, pass through the cell As the cell ring continues to rotate, the cell is again closed at both ends by the end-plates 2, 3. The contents of the cell are progressively expanded and still further cooled by the increasing volume of the cells, until the cell opens at its left-hand end to the low-pressure outlet port 7. Since the pressure of the fluid in the cell is higher than the total pressure at the outlet port, the fluid at a low-temperature will leave through the low-pressure outlet duct 12. Consequently, expansion waves, diagrammatically shown at 25, will pass through the cell. As the cell ring continues to rotate, the cell becomes closed to the low-pressure inlet port 5, and compression waves, diagrammatically shown at 26, pass through the cell. As the cell ring continues to rotate, the contents of the cell are progressively compressed by the decreasing volume of the cells until the cell again reaches the position X, after which the cycle of operation is continuously repeated.

During starting of the pressure exchanger, the spring loaded non-return valve 16 in the duct 14 opens automatically owing to the pressure in the duct 9 being higher than the pressure at the port 15 so as to permit high-pressure fluid to enter the cells through the inlet port 15, which facilitates self-starting of the pressure exchanger. However, during normal operation of the pressure exchanger the non-return valve closes automatically owing to the pressure at the port 15 now being higher than the pressure in the duct 9, so as to prevent a flow of fluid through the duct 14.

Referring now to the embodiment illustrated in FIGURE 3, in which like ports are identically referenced, the intermediate pressure inlet and outlet ports are positioned to communicate with the cells of the pressure exchanger after the cells have passed their position of maximum volume and before they reach their position of minimum volume. The operation of the pressure exchanger illustrated in this embodiment will be similar to that described in accordance with FIGURE 1.

The volume of the cells may be made to vary by several constructions, one of which is ilustrated in FIGURE 4. In this figure, the pressure exchanger includes a cell ring having a multiplicity of radial walls 23 arranged around an inner hub member 29 and having an outer tubular member in the form of a cylindrical rotatable shroud 30. The cells defined by the walls 28, the hub 29 and the shroud 30 are in themselves open-ended but the effective opening and closing of the ends of the cells is controlled by end-plates (as shown in FIGURES 1 and 3) one at each end of the cell ring, the end-plates having ports to lead fluid to and from the cells. The cell walls 28 are radially slidable in grooves 31 formed in the hub 29 and are forced against the cylindrical shroud 30 by springs 32 acting on the radially inner end of the cell walls 28. The cell ring rotates about an axis 33, and the cylindrical shroud 30 rotates about an axis 34, the speeds of rotation of the cell ring and the cylindrical shroud should be equal to or approximately equal to one another. The cylindrical shroud 30 is supported on four rollers 36 running in receses formed in a stationary casing 35. Alternatively, the rollers may be mounted in a loose cage, the rollers then functioning as the rollers of a roller race, the outer track being formed in the stationary casing 35 and the inner track being formed in the outer surface of the rotatable cylindrical shroud 30.

As can be seen from the figure, in operation of the pressure exchanger, the cells will vary in volume owing to the eccentricity of the axes of the cell ring and the cylindrical shroud.

It is to be understood that although the pressure exchanger illustrated in the accompanying drawing has been described as being of "uni-flow" configuration, that is a pressure exchanger in which the directions of flow of fluid passing through the cells at intermediate and low-pressure scavenging stages are the same, a "reverse-flow" pressure exchanger, that is a pressure exchanger in which the directions of flow of fluid passing through the cells at the intermediate and low-pressure scavenging stages are in opposed directions, may be used.

The pressure exchanger may be used in a refrigeration plant or as a heat pump.

I claim:

1. A pressure exchanger including a cell rotor, structure circumferentially surrounding the cell rotor, a plurality of substantially radially disposed movable walls arranged around the periphery of the rotor and defining a plurality of open-ended cells, end-plate structure effective to close the ends of the cells but having ports including a port to lead high-pressure elastic fluid to the cells, ports to lead low-pressure elastic fluid to and from the cells and ports to lead elastic fluid at pressures intermediate the aforementioned high and low-pressures to and from the cells, ducting to connect the ports to lead intermediate pressure elastic fluid to and from the cells, and means for moving said walls to vary the volume of the cells on relative motion between the cells and the end-plate structure.

2. A pressure exchanger including a cell rotor, structure circumferentially surrounding the cell rotor, a plurality of substantially radially disposed movable walls arranged around the rotor and defining a plurality of open-ended cells, end-plate structure effective to close the ends of the cells but having ports including a port to lead high-pressure elastic fluid to the cells, ports to lead low-pressure elastic fluid to and from the cells and ports to lead elastic fluid at pressures intermediate the aforementioned high and low-pressures to and from the cells, ducting to connect the ports to lead intermediate pressure elastic fluid to and from the cells, cooling means interposed in the ducting, and means for moving said walls relative to said rotor to vary the volume of the cells on relative motion between the cells and the end-plate structure.

3. A pressure exchanger including a cell rotor, structure circumferentially surrounding the cell rotor, a plurality of substantially radially disposed movable walls arranged around the rotor, and defining a plurality of open-ended cells, end-plate structure effective to close the ends of the cells but having ports including a port to lead high-pressure elastic fluid to the cells, ports to lead low-pressure elastic fluid to and from the cells, and ports to lead elastic fluid at pressures intermediate the aforementioned high and low-pressures to and from the cells, ducting to connect the ports to lead intermediate pressure elastic fluid to and from the cells, cooling means interposed in the ducting, and means for effecting relative movement between said walls and said rotor to vary on rotation of the rotor the volume of the cells from a position of minimum volume adjacent the port to lead high-pressure elastic fluid to the cells to a position of maximum volume adjacent the ports to lead low-pressure elastic fluid to and from the cells.

4. A pressure exchanger, wherein one fluid quantity expands so compressing another fluid quantity with which it is in direct contact, including:

(a) an outer tubular member having an internal circumferential surface, (b) an inner member having an external circumferential surface mounted within the tubular member, (c) a plurality of walls extending from the circumferential surface of at least one of said members to positions adjacent the circumferential surface of the other of said members to define therebetween a plurality of open-ended cells, (d) one of the members being constructed to permit the walls to slide therein, (e) end-plate structure effective to close the ends of the cells but having ports therein, including a port to lead elastic fluid at a high-pressure to the cells, ports to lead elastic fluid at a lower-pressure to and from the cells and ports to lead elastic fluid at pressures intermediate the aforementioned high and lower-presures to and from the cells, (f) ducting to connect the ports to lead elastic fluid at pressures intermediate the aforementioned high and lower pressures to and from the cells, (g) means to provide for relative rotation between at least one of the members and the end-plate structure, (h) the outer tubular member and the inner tubular member being eccentric one with respect to the other the arrangement being such that the distance between the circumferential surfaces is a minimum adjacent the port to lead elastic fluid at a high-pressure to the cells and is a maximum adjacent the ports to lead elastic fluid at lower-pressures to and from the cells, the walls sliding inwardly and outwardly in the member constructed for the purpose as the distance between the circumferential surfaces varies between a minimum and a maximum.

5. A pressure exchanger, wherein one fluid quantity expands so compressing another fluid quantity with which it is in direct contact, including:
 (a) an outer tubular member having an internal circumferential surface,
 (b) an inner member having an external circumferential surface mounted within the tubular member,
 (c) a plurality of walls extending from the circumferential surface of at least one of said members to positions adjacent the circumferential surface of the other of said members to define therebetween a plurality of open-ended cells,
 (d) one of the members being constructed to permit the walls to slide therein,
 (e) end-plate structure effective to close the ends of the cells but having ports therein, including a port to lead elastic fluid at a high-pressure to the cells, ports to lead elastic fluid at a lower-pressure to and from the cells and ports to lead elastic fluid at pressures intermediate the aforementioned high and lower-pressures to and from the cells,
 (f) ducting to connect the ports to lead elastic fluid at pressures intermediate the aforementioned high and lower-pressures to and from the cells,
 (g) cooling means interposed in the ducting,
 (h) means to provide for relative rotation between at least one of the members and the end-plate structure,
 (i) the outer tubular member and the inner tubular member being eccentric one with respect to the other the arrangement being such that the distance between the circumferential surfaces is a minimum adjacent the port to lead elastic fluid at a high-pressure to the cells and is a maximum adjacent the ports to lead elastic fluid at lower-pressures to and from the cells, the walls sliding inwardly and outwardly in the member constructed for the purpose as the distance between the circumferential surfaces varies between a minimum and a maximum.

6. A pressure exchanger, wherein one fluid quantity expands so compressing another fluid quantity with which it is in direct contact, including:
 (a) an outer tubular member,
 (b) an inner member mounted within the outer tubular member,
 (c) a plurality of walls extending from at least one of said members to positions adjacent the other of said members to define therebetween a plurality of open-ended cells,
 (d) one of the members being constructed to permit the walls to slide therein,
 (e) end-plate structure effective to close the ends of the cells but having ports therein, including a port to lead elastic fluid at a high-pressure to the cells, ports to lead elastic fluid at a lower-pressure to and from the cells and ports to lead elastic fluid at pressures intermediate the aforementioned high and lower-pressures to and from the cells,
 (f) ducting to connect the ports to lead elastic fluid at pressures intermediate the aforementioned high and lower pressures to and from the cells,
 (g) means to provide for relative rotation between at least one of the members and the end-plate structure,
 (h) the outer tubular member and the inner member being mounted one with respect to the other and being relatively shaped such that the distance between them varies during said rotation to vary the volume of said cells, the walls sliding inwardly and outwardly in the member constructed for the purpose as the distance between the outer tubular member and the inner member varies between a minimum and a maximum.

References Cited by the Examiner
UNITED STATES PATENTS
2,852,915  9/1958  Jendrassik _____ 230—69 X DONLEY J. STOCKING, *Primary Examiner.*
WARREN E. COLEMAN, LAURENCE V. EFNER, *Examiners.*